US010185747B2

(12) United States Patent
Benum et al.

(10) Patent No.: US 10,185,747 B2
(45) Date of Patent: Jan. 22, 2019

(54) PRESENTING PUBLISHER DATA SETS IN CONTEXT

(71) Applicant: Schlumberger Technology Corporation, Sugar Land, TX (US)

(72) Inventors: Trond Benum, Trondheim (NO); Floyd Louis Broussard, III, The Woodlands, TX (US); Nitin Jain, Abingdon (GB); Olivier Simondet, Cedar Park, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 344 days.

(21) Appl. No.: 14/869,384

(22) Filed: Sep. 29, 2015

(65) Prior Publication Data
US 2016/0203189 A1 Jul. 14, 2016

Related U.S. Application Data

(60) Provisional application No. 62/057,004, filed on Sep. 29, 2014, provisional application No. 62/103,326, filed on Jan. 14, 2015.

(51) Int. Cl.
*G06F 17/30* (2006.01)
(52) U.S. Cl.
CPC .. *G06F 17/30528* (2013.01); *G06F 17/30321* (2013.01); *G06F 17/30554* (2013.01); *G06F 17/30566* (2013.01)
(58) Field of Classification Search
CPC .................................................. G06F 17/30
USPC .................................. 707/722, 741
See application file for complete search history.

(56) References Cited

U.S. PATENT DOCUMENTS

| 6,606,603 | B1* | 8/2003 | Joseph | G06Q 10/087 705/1.1 |
| 8,826,036 | B1* | 9/2014 | Snodgrass | G06F 21/10 370/235 |
| 2007/0260628 | A1 | 11/2007 | Fuchs et al. | |
| 2010/0280912 | A1* | 11/2010 | Gopalpur | G06Q 20/203 705/22 |

(Continued)

FOREIGN PATENT DOCUMENTS

GB 2483971 A 3/2012

OTHER PUBLICATIONS

"CKAN v.2.2 User Guide and API", Feb. 4, 2014, Retrieved from the Internet: http://docs.ckan.org/en/ckan-2.2/user-guide.html?highlight=publish, 20 pages.

(Continued)

*Primary Examiner* — Kim T Nguyen
(74) *Attorney, Agent, or Firm* — Colin L. Wier; Alec McGinn; Gary Gex

(57) ABSTRACT

Approaches to sharing information about third-party data sets in the context of an application. A computing device may be used to determine the context of an application that is executing on the computing device and searching an index that includes entries representing publisher data sets. The computing device may search the index for entries that are associated with the context of the application. In response to finding such an entry, the computing device displays information about the publisher data set that is associated with the entry.

19 Claims, 10 Drawing Sheets

(56) References Cited

U.S. PATENT DOCUMENTS

| | | | | |
|---|---|---|---|---|
| 2012/0296829 | A1* | 11/2012 | Camenisch | G06Q 20/38 |
| | | | | 705/67 |
| 2013/0218638 | A1* | 8/2013 | Kilger | G06Q 30/02 |
| | | | | 705/7.32 |
| 2016/0203189 | A1* | 7/2016 | Benum | G06F 17/30566 |
| | | | | 707/722 |
| 2016/0267191 | A1* | 9/2016 | Khosravy | G06F 17/30471 |
| 2016/0314517 | A1* | 10/2016 | Ogilvy | G06Q 20/12 |

OTHER PUBLICATIONS

Deng, et al., "Information Integration Based on Open Geospatial Database Connectivity Specification", Nov. 2010, Retrieved from the Internet: http://www.isprs.org/proceedings/XXXVIII/part4/files/Deng.pdf, 6 pages.

Ma, et al., "Research on three-layered metadata model for oil-gas data integration", Sep. 15, 2011, IEEE International Conference on Cloud Computing and Intelligence Systems, pp. 500-504.

Extended European Search Report issued in related EP application 15187381.7 dated Feb. 10, 2016, 15 pages.

* cited by examiner

PRESENTING PUBLISHER DATA SETS IN CONTEXT

CROSS-REFERENCE TO RELATED APPLICATIONS

This application claims priority to and the benefit of: (1) U.S. Provisional Application having Ser. No. 62/057,004 and filed 29 Sep. 2014 which is incorporated herein by reference; and (2) U.S. Provisional Application having Ser. No. 62/103,326 and filed 14 Jan. 2015 which is incorporated herein by reference.

BACKGROUND

Many applications use data sets for their operations. For example, in the oil and gas industry, a company may have data sets representing seismic data from a particular seismic survey, well logs, and others that users can use to make decisions. Typically, the application exposes the company's data sets. However, there are often other data sets offered by publishers that are available and that may be beneficial to the user. Finding these data sets, and evaluating their relevance, can be challenging. The user may have to leave the application to, for example, search for the publisher data sources on the Internet. Even if the user finds publisher data sets, it can be difficult to evaluate their relevance to the project.

SUMMARY

Embodiments of a system for displaying publisher data sets are disclosed. The system may include a computer server that contains an index of publisher data sets. The computer server may be configured to receive index entries from publishers. The index entries may include metadata that is associated with the publisher data sets corresponding to the index entries. The server may make the index available to certain computing devices. The system may also include the computing devices that are in communication with the server. The computing devices may be configured to access the index from the computer server. The computing device may also determine a context of an application that is executing on the computing device and to identify customer data sets that are associated with the context of the application. Using the index, the computing device may also identify publisher data sets that are associated with the context of the application and display the customer data sets and the publisher data sets. The computing device may display them such that the customer data sets are visually differentiated from the publisher data sets.

Also disclosed is a non-transitory computer-readable medium with instructions stored thereon. These may include instructions for determining criteria for selecting customer data sets for an application and selecting the customer data sets that satisfy the criteria. The instructions may also cause searching an index of publisher data sets for index entries that satisfy the criteria. The publisher data sets may not be accessible by the computing device. The index may be received from a remote computing device and include index entries created by associated publishers. The instructions may also cause selecting the index entries that satisfy the criteria and displaying information about the selected customer data sets and the selected index entries.

Also disclosed is a computer-implemented method that involves accessing an index that includes index entries. This index may be stored on a remote computing device. The index entries may represent publisher data sets that are not accessible to the computing device that is accessing the index. The index entries may include metadata describing the associated publisher data sets. The method may involve determining a context of an application and identifying those customer data sets that are associated with the context of the application. The method may also involve, using the index, identifying one or more publisher data sets associated with the context of the application and displaying a representation of the customer data sets and the publisher data sets.

The foregoing summary is provided to introduce a selection of concepts that are further described below in the detailed description. This summary is not intended to be comprehensive, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
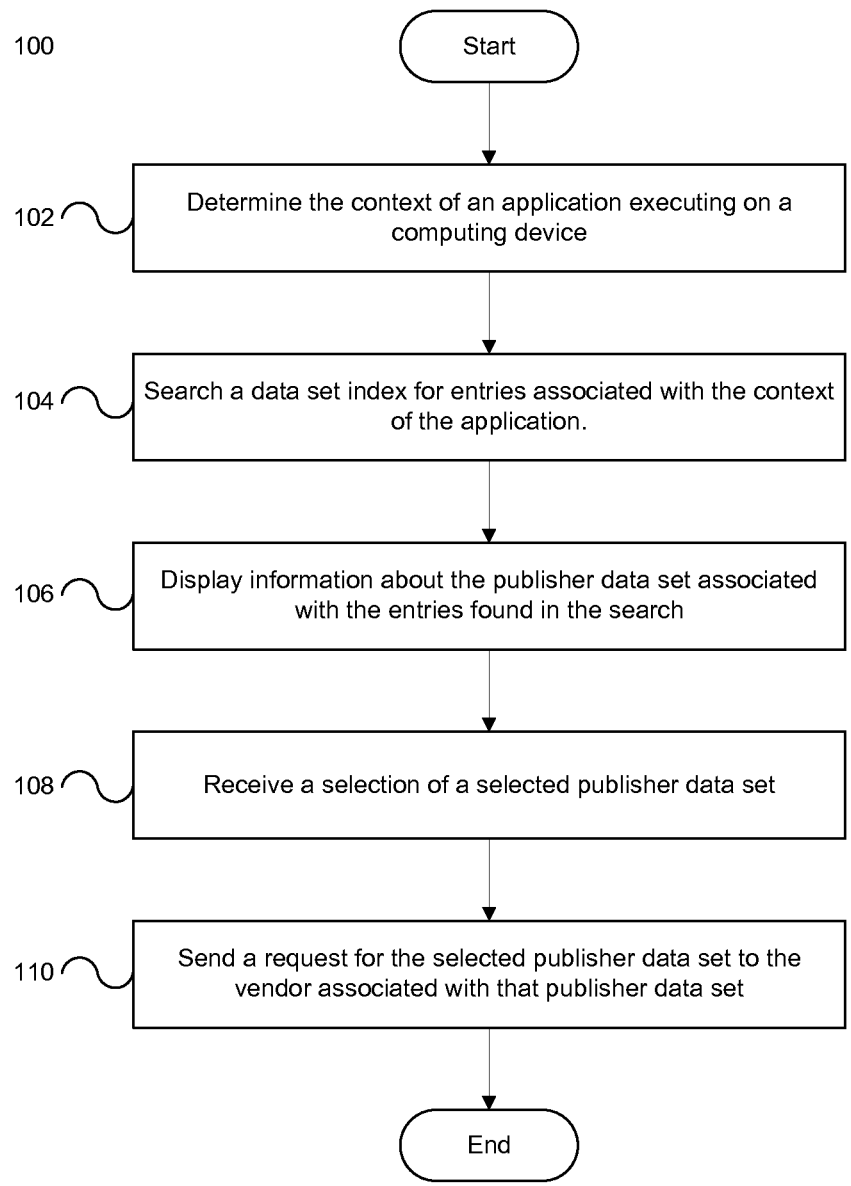
FIG. 1 illustrates a flow chart showing one embodiment of a method for presenting publisher data sets to a customer.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

The present disclosure describes a system for displaying publisher data sets. The system includes a server that contains an index of publisher data sets. The server is configured to receive index entries from publishers (such as data vendors, government agencies, academic institutions, or others). The index entries include metadata associated with the publisher data sets corresponding to the index entries. For example, the index entries may include a name, a geographic location, a type (seismic, well log, etc.), publisher name, cost, and other metadata.

The server may make the index available to one or more computing devices. For example, the server may communicate the index, or individual entries, securely using networks (such as the Internet) to computing devices that are communicatively coupled to it.

The computing devices may be configured to access the index from the computer server. These computing devices may be executing one or more applications that are associated with the index. The computing device may determine the context of such an application and identify the customer data sets associated with that context. For example, the user may be performing a workflow that requires well logs and be performing that workflow for a particular geographic location. The computing device may determine that, based on the context, it should find well logs within that geographic location. The computing device may then identify the customer data sets that are associated with the particular context and display those customer data sets for the user.

The computing device may be further configured to, using the index, identify publisher data sets that are associated with the context of the application. The computing device may then display the relevant customer data sets and the publisher data sets to the user, and visually differentiate between the two. In one embodiment, the context is a set of rules that determines what customer data sets are exposed to the user. The context may include filters that are set by the application automatically or with input from the user.

The user, if interested in a particular publisher data set, may select the publisher data set and request it. In response, the server may provide information to the user about how to obtain the publisher data set. For example, the server may provide contact information, pricing information, or other. The server may also provide additional information such as a more detailed description of the publisher data set, a sample, promotional material, or other. The user may then negotiate with the publisher to gain access to the publisher data set.

In general, embodiments of the present disclosure may provide systems, methods, and computer-readable media for presenting information about publisher data sets in context. FIG. 1 is a flow chart illustrating one embodiment of a method 100 for presenting such information. The method 100, in one embodiment, begins with determining 102 the context of an application that is executing on a computing device. As used herein, context refers to the state of an application. For example, context may include the following (either alone or in combination): an operation being performed in the application (well log analysis, seismic analysis, etc.); a workflow; a geographic location under consideration; search criteria specified by a user; and others.

The method 100 may also include searching 104 a data set index for entries that are associated with the context of the application. As used herein, the term index refers to a data source (regardless of structure) that contains entries representing and identifying publisher data sets. The index itself may be a table, a list, a database, or other appropriate data structure. The entries may include samples of the data set, metadata about the publisher data sets, and other information that may be relevant to making a decision as to whether to obtain a particular publisher data set associated with the entry.

Publisher data sets are collections of data that publishers make available to third parties. For example, in an oil and gas industry context, the publisher data sets may be well logs, seismic survey information, or others. Publishers are persons or entities that make the data set available. The publishers may charge for access to their data sets, or may provide them free of charge. Publishers may be, for example, companies, individuals, governmental entities, academic institutions, or others.

The method 100 may involve displaying 106 information about the publisher data sets associated with the entries found in the search. For example, an icon with a name or identifier of the publisher data set may be displayed. Other information, such as the name of the publisher, pricing information, the type of data within the data set, or other may also be displayed.

In certain embodiments the method 100 includes receiving 108 a selection of a selected publisher data set. For example, a user of the application may determine that a particular publisher data set may be beneficial and requests the publisher data set. In response, the method 100 may involve sending 110 a request for the selected publisher data set to the publisher that is associated with the publisher data set.

Figure 2:
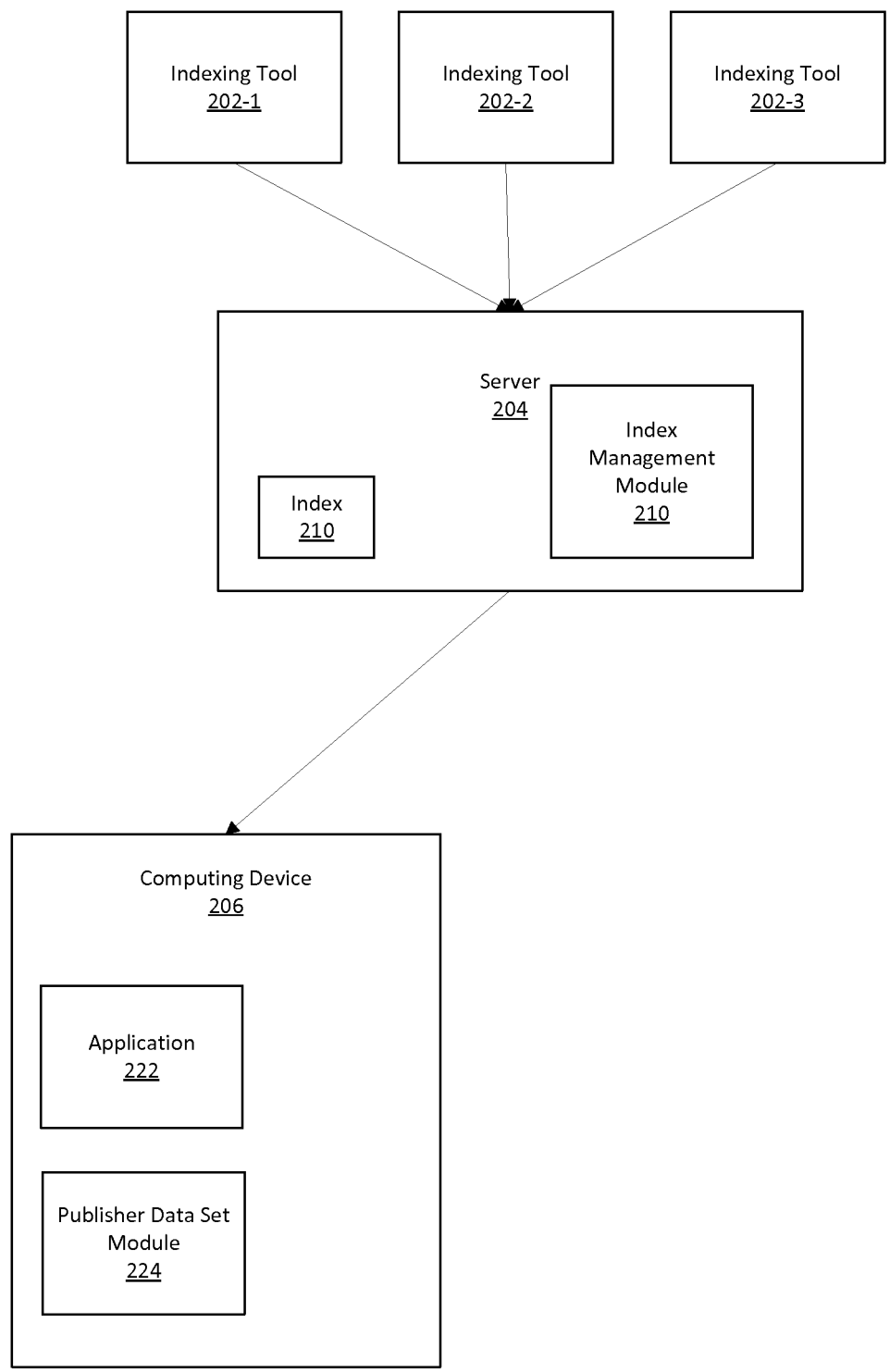
FIG. 2 illustrates a conceptual, schematic view of a system for creating and sharing an index for publisher data sets.

FIG. 2 illustrates one embodiment of a system 200 for presenting publisher data sets. In the depicted embodiment, the system 200 includes indexing tools 202-1 to 202-3, a server 204, and a computing device 206.

The indexing tools 202-1 to 202-3 (referred to generally as indexing tool 202) create entries for the index 210 of publisher data sets. Publishers may provide information about the publisher data sets that they wish to make available to uses of the application 222 using the indexing tool 202. The indexing tool 202 may use the provided information to create the entries. The indexing tool 202 may insert the entries into the index 210. For example, the indexing tool 202 may send the entries over a network connection, such as an Internet connection, to the server 204 where the entries are added to the index 210.

In certain embodiments, the indexing tool 202 is provided to publishers as an application that the publisher may install on the publishers' computing devices. In such embodiments, multiple indexing tools 202 may be in communication with a server 204. In other embodiments, the indexing tool 202 may be hosted at one location and made available to publishers. For example, the indexing tool 202 may be an application hosted on the server 204 and made available to publishers as a web application. In such embodiments, publishers may be provided with login information to use the indexing tool 202. The indexing tool is discussed in greater detail in connection with FIG. 3.

The system 200 may also include a server 204. The server 204 may host a central copy of the index 210. The server 204 may be one or multiple computing devices making the index 210 available to the publisher data set module 224. In certain embodiments, the sever 204 includes an index management module 210 that manages the index 210. The index management module 210 may receive entries from the indexing tools 202 and add those entries to the index 210. The index management module 210 may also receive deletions and changes to entries in the index 210. The index management module 210 may further communicate the additions, deletions, and changes to the publisher data set module 224. The server 204 and the index management module 210 are discussed further in connection with FIG. 5.

The system 200 may also include a computing device 206 with an application 222 and a publisher data set module 224. In one embodiment, the application 222 is an oil and gas software application such as STUDIO® by SCHLUMBERGER®. In operation, the application 222 may receive criteria for selecting customer data sets (i.e., those customer data sets for which the customer has rights and access). The customer data sets may include well logs created by the customer, seismic data created for the customer, and others. The customer data sets may be stored on the computing device 206 or on a local network to which the computing device 206 can connect.

The application 222 may select those relevant customer data sets that satisfy the specified criteria and display information about the relevant customer data sets. For example, a user may specify a particular geographic area that is of interest to the user. The application 222 may select those customer data sets within the geographic area as being relevant. The customer may also specify additional criteria such as, for example, a type of data set (e.g., well logs), a keyword, a project name, or others.

The computing device 206 may also include a publisher data set module 224. The publisher data set module 224 may search the index 210 for relevant publisher data sets that also satisfy the criteria provided by the user. The publisher data set module 224 may then display information about the relevant publisher data sets along with the relevant customer data sets. As a result, a user may be able to see and evaluate the value of publisher data sets within the context of the workflow being executed by the application 222. The user may also see how the publisher data sets supplement the information available through the customer data sets.

The publisher data set module 224 may be implemented as a part of the application 222, as a plugin for the application 222, or as a separate program in communication with the application 222. The publisher data set module 224 may store a local copy of the index 210 or access the index 210 via the server 204. The publisher data set module 224 is discussed in greater detail in connection with FIG. 6.

The embodiment shown in FIG. 2 is but one possible implementation of a system 200. In one embodiment, one indexing tool 202 is provided for each publisher. In another embodiment, there is one indexing tool 202 provided and made available to publishers via a network connection. In other embodiments, the system 200 may be implemented without a server 204. For example, the publisher data set modules 224 may store local copies of the index 210 and the indexing tool 202 may communicate directly with the publisher data set modules 224 to provide additions, deletions, and changes to the index 210. Other variations on the system 200, in addition to those described herein, are also possible.

Figure 3:
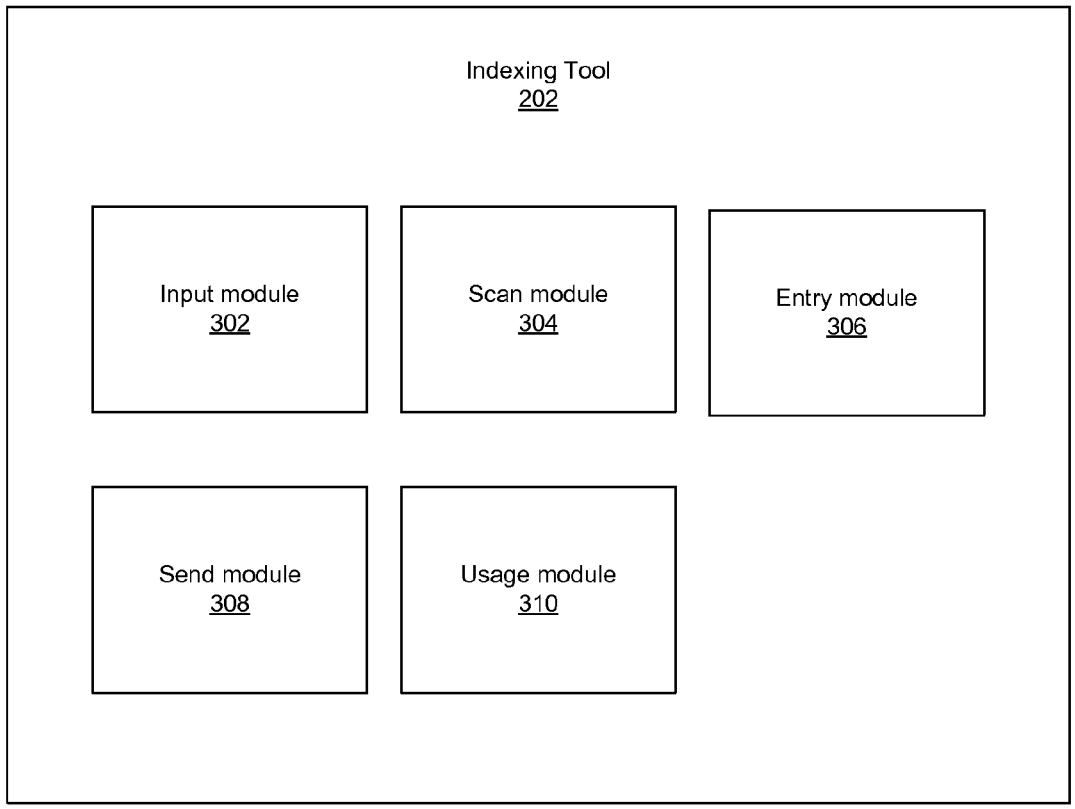
FIG. 3 illustrates a conceptual, schematic view of one embodiment of an indexing tool.

FIG. 3 illustrates one embodiment of an indexing tool 202. In the depicted embodiment, the indexing tool 202 includes an input module 302, a scan module 304, an entry module 306, and a send module 308.

The indexing tool 202 may include an input module 302 for receiving information about publisher data sets. The input module 302 may allow a user to enter information about the publisher data set. For example, the input module 302 may receive information such as a name for the data set, publisher contact information, location information (i.e., a geographical location for the data set), a type/format, metadata, and other information. The input module 302 may also allow the user to provide pricing information for the publisher data set.

In certain embodiments, the input module 302 may also allow the publisher to manage existing entries in the index 202. For example, the indexing tool 202 may display a list of entries in the index 202, where each entry represents a publisher data set for that publisher. The publisher, via the input module 302, may be given the ability to remove entries and make changes to entries (for example, updating price information).

The indexing tool 202 may also include a scan module 304. The scan module 304 may scan the publisher data set to extract information about the publisher data set. For example, in one embodiment, the scan module 304 may extract a title, format information, sample data, or other information. In one embodiment, the scan module scans the publisher data set, extracts information, and presents the scanned information to the publisher for verification and confirmation.

The indexing tool 202 may also include an entry module 306. The entry module 306 may use the information provided through the input module 302 and the scan module 304 to generate an entry for the index 210. In one embodiment, the entry module 306 complies the information into an expected format for entries into the index 210. When a publisher makes changes to an existing entry, the entry module 306 may generate a delta that specifies the value to be changed, and the new value provided by the publisher. When a publisher deletes an existing entry, the entry module 306 may identify the entry and associate it with a delete action.

The indexing tool 202 may also include a send module 308 that sends the entries generated by the entry module 306 to the index 210. The send module 308 may also be send instructions to change or delete existing entries as specified by the publisher. In one embodiment, the index 210 is hosted on a remote computing device (such as a server) that is connected via a network to the indexing tool 202. In such an embodiment, the send module 308 may send the add/change/delete instruction over the network. In another embodiment, the indexing tool 202 and the index 210 may be hosted on the same machine. In such an embodiment, the send module 308 may send the add/change/delete instruction over a local connection, such as a communications bus.

The indexing tool 202 may also include a usage module 310. The usage module 310 receives information on the exposure of the publisher data sets through the index 210. For example, as discussed in greater detail below, a computing device may track the number of times a particular publisher data set appears in search results, the number of times a user selects the particular publisher data sets, and other information about the frequency with which the publisher data sets are shown, the amount of interaction with the publisher data sets, and other information. The usage module 310 may present this information to the publisher. For example, the usage module 310 may generate graphs, tables, and other displays that allow the publisher to determine how potential customers are viewing the data sets.

Figure 4:
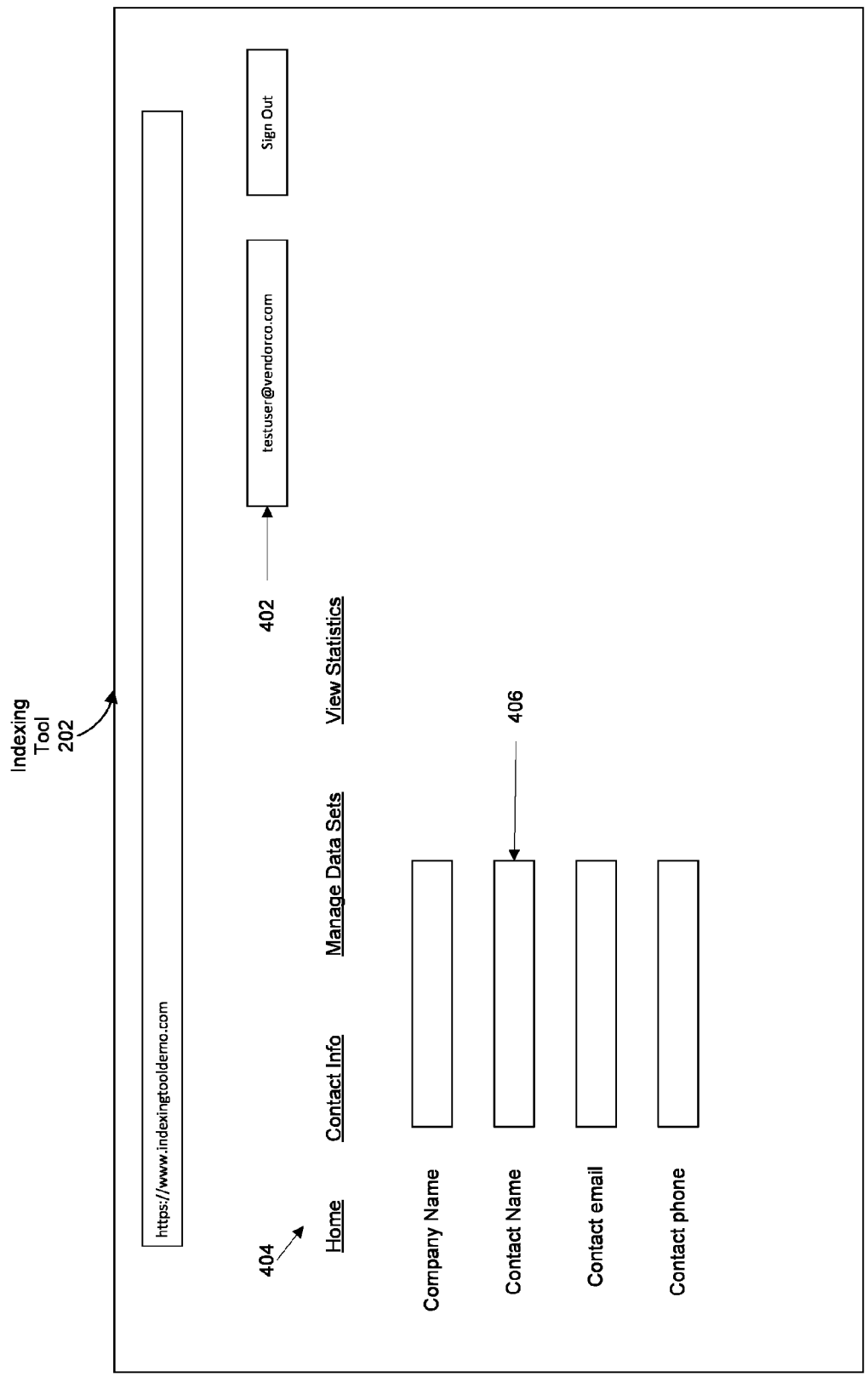
FIG. 4 illustrates a conceptual, schematic view of one embodiment of a GUI implementing an indexing tool.

FIG. 4 illustrates one embodiment of an indexing tool 202 implemented on a server that is accessible via an Internet browser. The indexing tool 202 includes a login section 402 that allows a publisher to login to, and access, the indexing tool 202. The indexing tool 202 may filter the information presented via the indexing tool to ensure that the publisher has access to information about its data sets, but not the data sets of others.

The indexing tool 202 shown in FIG. 4 also includes links 404 to features provided by the indexing tool 202. For example, the indexing tool 202 may have a contact information screen ("Contact Info") that provides fields 406 for the company name, contact name, contact email, and contact phone number. The user may enter this information into the indexing tool 202. In response, the indexing tool 202 may associate publisher data sets provided by the publisher associated with the login with the contact information provided in fields 406.

The indexing tool 202 may also provide a link 404 to manage the publisher data sets. The link may allow the user to add, delete, and change publisher data sets as described above. In one embodiment, the indexing tool 202 allows the publisher to group publisher data sets into bundles. For example, a publisher may find related publisher data sets and offer the group as a bundle.

In certain embodiments, the indexing tool 202 may allow the publisher to manage access to the publisher data sets. For example, the indexing tool 202 may be used to issue licenses to the publisher data sets. After the license period expires, the indexing tool 202 may revoke the license for the publisher data sets to prevent further access until the customer renews the license. The indexing tool 202 may also be configured to issue limited test licenses for publisher data sets.

As described in further detail below, the system 200 may track information about how users of the application 222 are presented with, and interacting with, the publisher data sets. The "View Statistics" link 404 may allow the publisher to view information such as the number of times the publisher's publisher data sets have appeared to end users in search. It may also allow the publisher to view information such as the number of times the user selected the publisher data set (by, for example, clicking on it after it is displayed) to obtain additional information. The View Statistics link may help the user determine how much exposure the publisher data sets are getting through the system 200. The publisher may use this information to try to increase exposure or identify problems; for example, a particular publisher data set may frequently appear in search results, but the users may not be clicking on it to get additional information.

In one embodiment, the index management module 210 (discussed below) may track baseline information and share that information through the indexing tool 202. For example, the index management module 210 may track, on average, how many times a publisher data set appears in search results before a user selects the publisher data sets, how many times a publisher data set appears in search results before a purchase is made, and other information across the various publishers. The indexing tool 202 may present this information to the publisher to help the publisher evaluate the effectiveness of the publisher's entries. For example, if a click-through conversion rate for a particular publisher is below the average, the indexing tool 202 may make this information available to the publisher.

Figure 5:
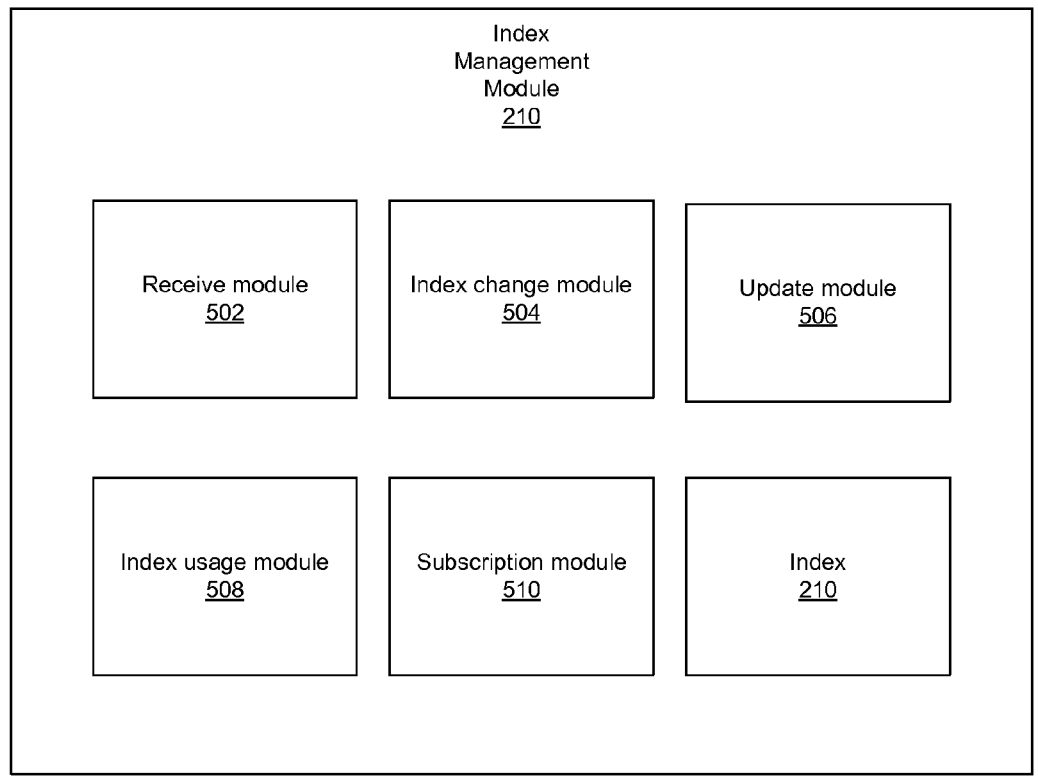
FIG. 5 illustrates a conceptual, schematic view of one embodiment of an index management module.

FIG. 5 illustrates one embodiment of an index management module 210. In certain embodiments, the index management module 210 is implemented on a server 204 and connected via a network connection to the indexing tools 202 and the publisher data set modules 224 that are installed on computing devices 206.

In one embodiment, the index management module 210 includes a receive module for receiving entries from indexing tools 202. The index management module 210 may be connected to numerous indexing tools 202 and receive entries/deletions/updates from them. The index management module 210 may also include an index change module 504 that changes the index 210 based on the information received by the receive module 502. For example, the index change module 504 may add new entries to the index 210, delete entries to the index 210, or modify entries to the index 210.

The index management module 210 may also include an update module 506. In certain embodiments, the publisher data set module 224 may be deployed on numerous computing devices and may keep local copies of the index 210. In such embodiments, the update module 506 may send a message to the publisher data set modules 224 to update the local copies of the index 210. The update module 506 may send the updates (additions, deletions, changes) as they are received, at predefined intervals (e.g., each night), as requested by the users of the publisher data set modules 224, or other.

The index management module 210 may also include an index usage module 508. The index usage module 508 saves information related to the impression information for the publisher data sets in the index 210. For example, when a particular publisher data set appears in a results list on a particular machine, the publisher data set module 224 on that machine may send a message indicating that the particular publisher data set appeared in a search result. An additional message, or a different message, may be sent if the user selects the particular publisher data set. This additional message may indicate a greater degree of interaction or interest than a message that the publisher data set simply appeared in a search result. The index management module 210 may save the impression information to the server and make the impression information for a particular publisher's data sets available to that publisher.

The index management module 210 may track baseline information and share that information through the indexing tool 202. The index usage module 508 may track information general information about publisher data sets. For example, the index usage module 508 may track which geographic locations generate the most purchases, the types of publisher data sets most likely to generate a request, on average, how many times a publisher data set typically appears in search results before a user selects the publisher data sets, and other information.

The index management module 210 may, in certain embodiments, include a subscription module 510. Some customers may want to limit the publishers from whom they see entries. In such an embodiment, the customers may subscribe to a particular publisher or set of publishers. The subscription module 510 may store subscription information for one or more customers and filter the index 210 according to the subscription rules defined by the customer. For example, a particular user may want to see publisher data sets from publishers A, B, and C. The update module 506, in sending out updates to local copies of the index 210, may apply the rules specified in the subscription module 510 such that the local copy of the index 210 for that customer does not receive entries for a publisher D.

Figure 6:
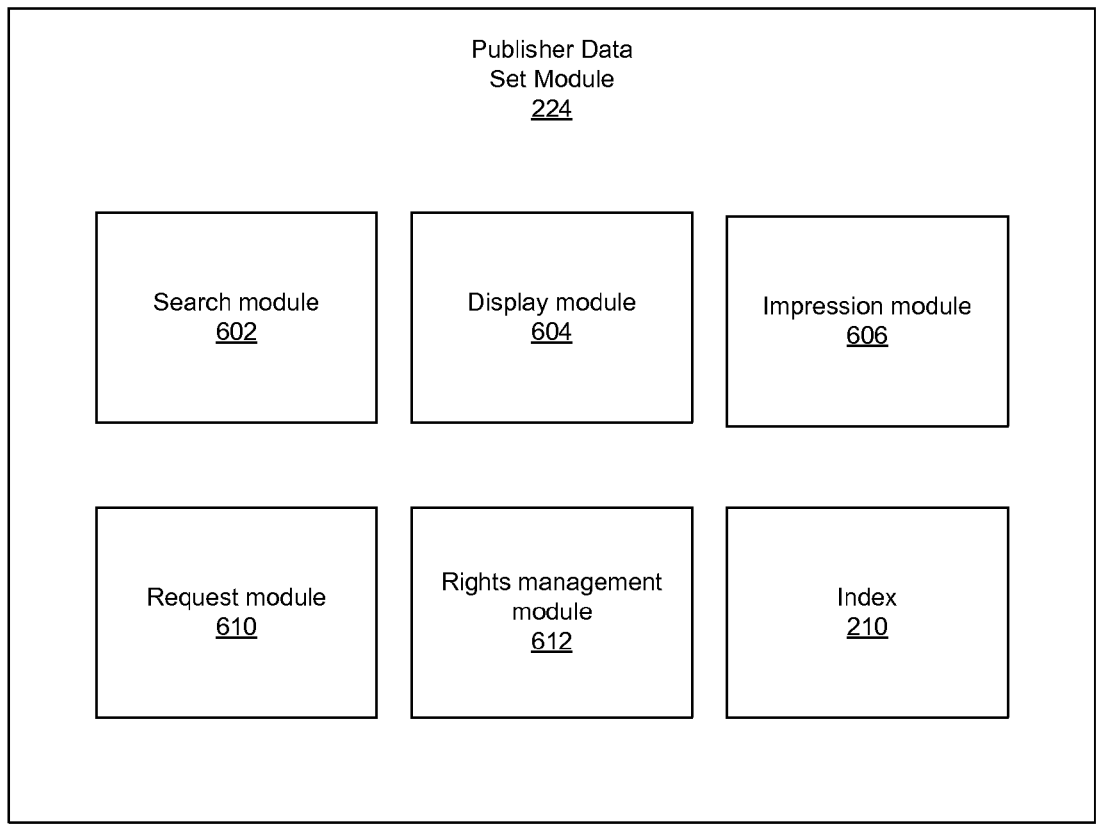
FIG. 6 illustrates a conceptual, schematic view of one embodiment of a publisher data set module.

FIG. 6 illustrates one embodiment of a publisher data set module 224. The publisher data set module 224 is associated with the application 222 and may be configured to run on a customer's computing device 206. The publisher data set module 224 has access to the index 210 that contains entries for the publisher data sets. The index 210 may be a local copy that is updated. The publisher data set module 224 may access a cloud-hosted version of the index 210 over a network connection. The publisher data set module 224 uses the index 210 to find publisher data sets that are relevant to the context of the application 222.

The publisher data set module 224 may include a search module 602 that determines the context of the application 222 and searches the index 210 for relevant publisher data sets. The application 222 may receive, for example, search criteria to select relevant customer data sets that satisfy the search criteria. The search module 602 may determine the search criteria for selecting the relevant customer data sets in the application 222 and apply the search criteria to the index 210 to find publisher data sets that satisfy one or more of the search criteria.

For example, a user (whether human or machine) may perform an action using the application 222 that causes the application 222 to display information about the customer's data sets within a particular geographic area. The user may also specify a type of data set (e.g., well logs). In response, the application 222 may find customer data sets that are well logs within the specified geographic area. The search module 602 may receive the search criteria (in this case, well logs within a specified geographic area) and search the index 210 for entries representing relevant publisher data sets that satisfy the search criteria. The search module 602 may identify those publisher data sets that are well logs within the geographic area as satisfying the search criteria.

The display module 604 may, in response to the search module 602 finding relevant publisher data sets, display information about the relevant publisher data sets associated with the entries. The display module 604 may display the information in the context of the workflow, helping the user appreciate the nature of the publisher data set and how it relates to the workflow. The display module 224 may visually differentiate the relevant customer data sets from the relevant publisher data sets. The display module 604 may, for example, display the information about the relevant publisher data sets alongside the relevant customer data sets and flag them with an icon or color, display the relevant publisher data sets in a separate tab, or other manner. One example of a graphical user interface (GUI) for displaying relevant publisher data sets is provided in FIG. 7.

The publisher data set module 224 may also include an impression module 606 for tracking impressions relating to the index 210. The impression module 606 may track the number of times that publisher data sets for the index 210 are responsive to search criteria and the number of times information for the publisher data sets is displayed. The impression module 606 may also track the number of times the user interacts with the information displayed for the publisher data set. For example, if a user selects the publisher data set, more detailed information may be displayed. This interaction may be captured by the impression module 606.

The impression module 606 may also send the impression information to a remote computing device, such as the server 204. The impression information may be made available to the publishers through the server 204. For example, a web tool may allow publishers to view statistics as discussed in connection with FIG. 4. In certain embodiments, the impression module 606 may remove anonymize the impression information prior to sending the impression information. For example, the impression module 606 may remove information identifying the customer before sending the impression information to the server 204.

The publisher data set module 224 may also include a request module 610 for facilitating transactions involving publisher data sets. In one embodiment, the request module 610 allows the customer to request additional information about a relevant publisher data set, request a contact from a publisher representative, or request purchase of the relevant publisher data set.

The publisher data set module 224 may also include a rights management module 612. The rights management module 612 may enforce one or more restrictions associated with publisher data sets for which the customer obtains rights. For example, in one embodiment, the rights management module 612 tracks the life of a license for a particular publisher data set. Once the license expires, the rights management module 612 may prohibit the customer from accessing the publisher data set. The rights management module 612 may also provide reminders and notices to a user when a license is about to expire.

The request module 610 may transmit the request to the publisher associated with the publisher data set. In one embodiment, the request module 610 sends an email to the publisher representative. In another embodiment, a notification appears on a dashboard or tool for managing publisher data sets, such as the indexing tool 202 shown in FIG. 4. Approaches to transmitting publisher data sets selected by a customer are described in further detail below.

Figure 7:
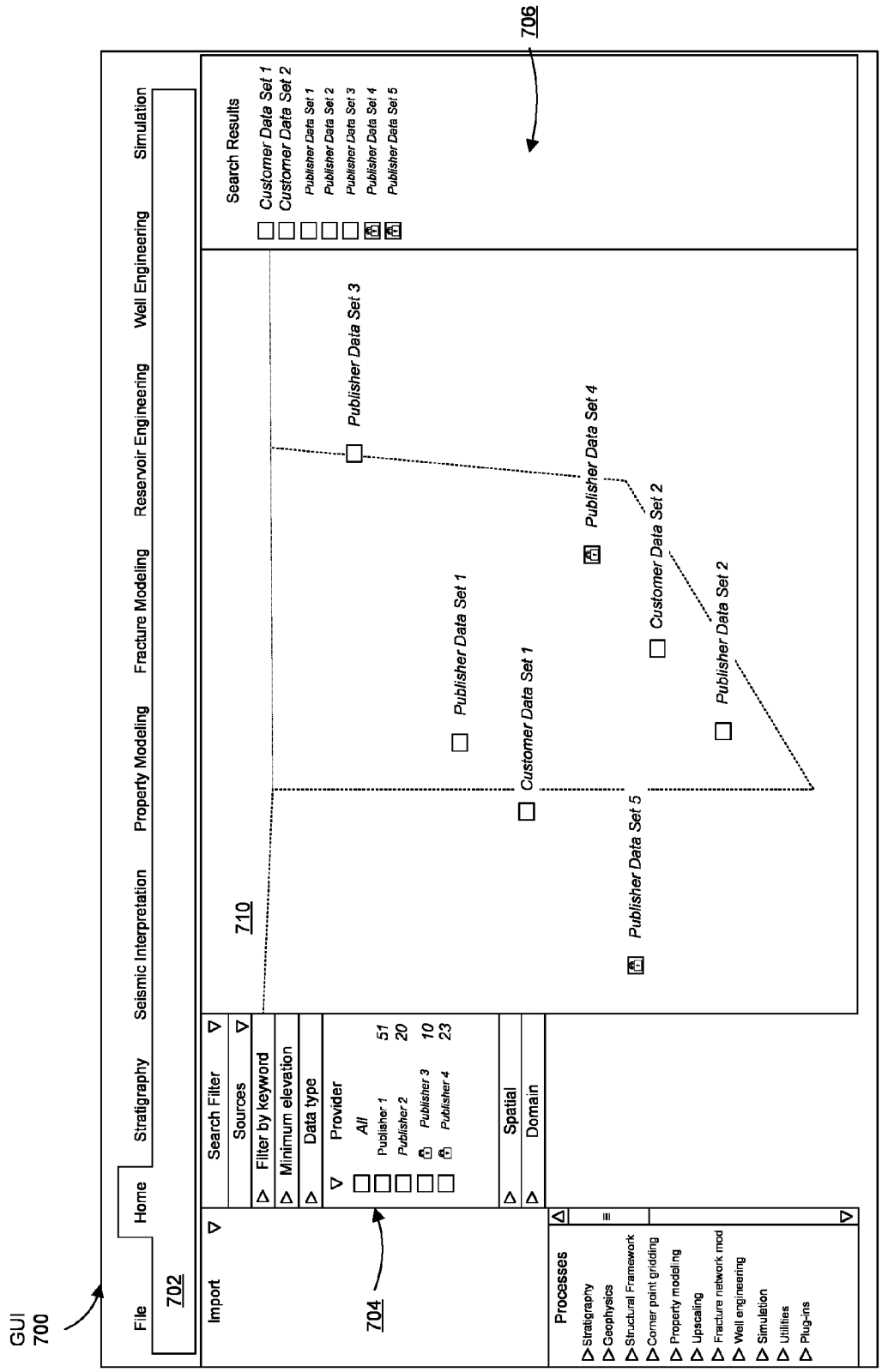
FIG. 7 illustrates a conceptual, schematic view of one embodiment of a GUI for an application working with a publisher data set module.

FIG. 7 illustrates one embodiment of a GUI 700 for an application 222 using a publisher data set module 224. The GUI 700 may include a panel with identifiers for related operations; in FIG. 7, the GUI 700 includes the panel 702 (on the "Home" page) with identifiers such as stratigraphy, seismic interpretation, and others. The identifiers may open a set of operations related to the specified identifier. For example, selecting the "seismic interpretation" option may present GUI elements that the user can select to perform various actions in connection with seismic interpretation. In one embodiment, the one or more filters may be selected or de-selected by the application 222 based on the panel selected by the user.

The GUI 700 may also provide a search panel 704. The search panel 704 may allow a user to enter search criteria for selecting data sets. For example, the search panel 704 illustrates options to filter by keywords, by source (for example, customer data sets or publisher data sets), by provider, and others. In the depicted embodiment, the customer can see the names of publishers and information about the number of data sets from that publisher matching the specified search criteria. In FIG. 7, for example, publisher 1 has 51 publisher data sets that match the search criteria. In FIG. 7, data sets that the customer does not have access to may be shown with a lock icon. In one embodiment, the user may click the lock to be directed to a page to request access to the publisher's data sets.

FIG. 7 also illustrates a search results panel 706. The search results panel 706 may display the customer data sets (such as customer data sets 1 and 2) and the publisher data sets (such as publisher data sets 1-5) that satisfy the search criteria. In certain embodiments, the publisher data sets may be displayed with a flag, with a different color, or other differentiator to distinguish between customer data sets and publisher data sets.

The GUI 700 may also include a map panel 710. The map panel 710 may display a map of a region of interest and allow the user to navigate to different geographic areas. In one embodiment, the geographic area shown in the map panel 710 acts as a search criteria. As the user moves to different areas of the map, or zooms in and out from the map, the application 222 may dynamically update the search criteria such that those data sets within the geographic area shown in the map panel 710 are displayed while those data sets outside the geographic area are not. The application 222 may also display markers on the map panel 710 indicating the geographic location associated with the particular data set.

Figure 8:
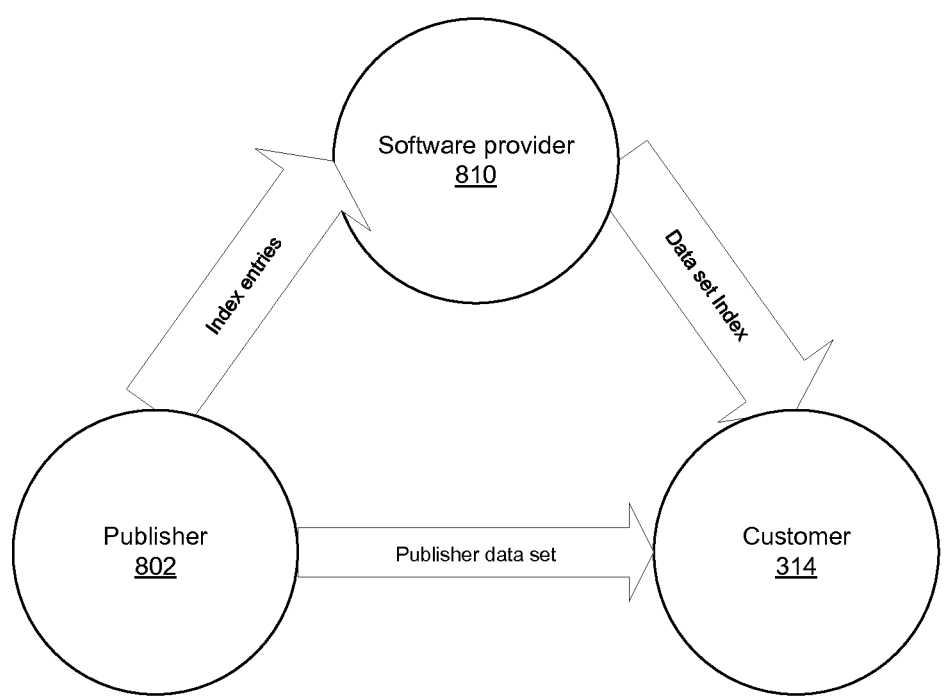
FIG. 8 illustrates a conceptual, schematic view of one embodiment of sharing index information and data sets.

FIG. 8 illustrates one embodiment of an approach to managing transfers of data sets. In FIG. 8, a publisher 802 may create index entries to be placed in a data set index managed by a software provider 810. The software provider 810, in one embodiment, is the provider of the application 222. The software provider 810 may receive the index entries from multiple publishers 802, aggregate them, and provide an index 210 containing multiple index entries from the multiple publishers 802. The software provider 810 may provide the data index to customers 314 using the application 222.

In certain embodiments, the customer 314 communicates a desire to purchase a publisher data set to the publisher 802 through the software provider 810. For example, as discussed above, the publisher data set module 224 may allow the customer 314 to generate a request for the relevant publisher data set. In one embodiment, the publisher data set module 224 communicates the request through the software provider 810 to the publisher. In one embodiment, the publisher providers licensing or purchase information to the customer 314 through the software provider 810. For example, the publisher 802, using the indexing tool 202, may send a license key to the publisher data set module 224.

In certain embodiments, the customer 314 obtains the publisher data set directly from the publisher 802. The system 200, in certain embodiments, may thus facilitate finding and purchasing publisher data sets without the software provider 810 storing copies of the publisher data sets or executing the transfers directly. In other embodiments, the software provider 810 may store copies of the publisher data sets and provide them to the customer 314 in response to the customer 314 purchasing rights to a publisher data set.

Figure 9:
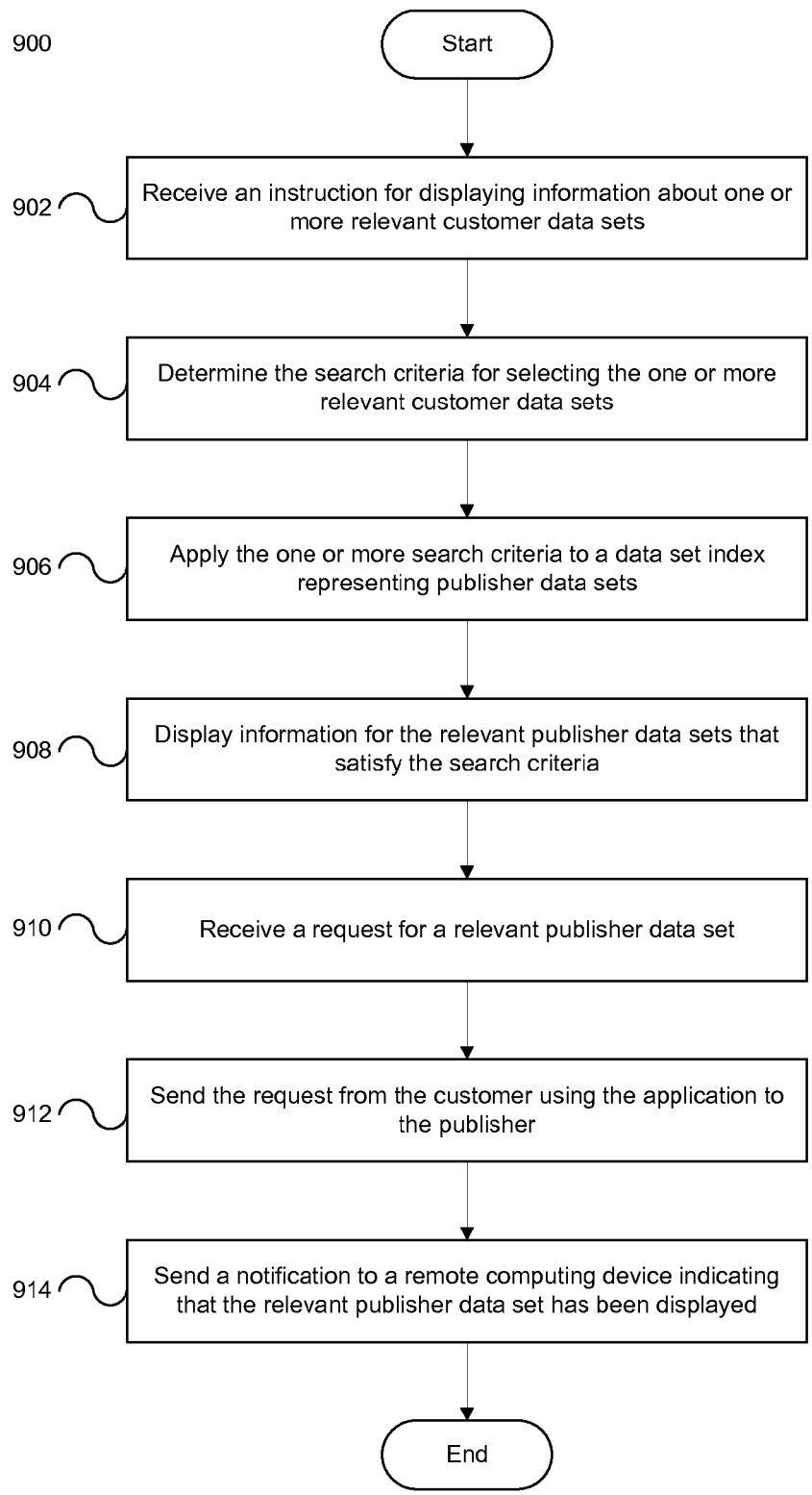
FIG. 9 illustrates a flow chart showing one embodiment of a method for displaying information about publisher data sets.

FIG. 9 illustrates one embodiment of a method 900 for providing information about publisher data sets in context. In one embodiment, the method is executed by a processor reading a non-transitory computer-readable medium.

The method 900 may begin with receiving 902 an instruction for displaying information about one or more relevant customer data sets. The customer data sets may be relevant to the workflow being executed by an application. The method 900 may continue with determining 904 the search criteria used for selecting the relevant customer data sets. The search criteria may be provided by a user of the application, by the application itself, or a combination thereof.

The method 900 may continue with applying 906 the one or more search criteria to a data set index that represents publisher data sets. For example, the search criteria may specify one or more values. Entries in the data set index may be scanned and those entries with values satisfying the search criteria may be selected.

The method 900 may also include displaying 908 information for the relevant publisher data sets that satisfy the search criteria. For example, the method may involve displaying the name of the publisher, the name of the data set, descriptions of the data set format and type, and other information. The information may be displayed along with information about the relevant customer data sets that satisfy the search criteria. The relevant customer data sets and the relevant publisher data sets may be distinguished by color, through an icon, or other.

The method 900 may also involve receiving 910 a request for a relevant publisher data set. The request 910 may be a request to purchase the publisher data set outright, to obtain a license to access the publisher data set, or other. In response, the method 900 may include sending 912 the request from the customer who is using the application to the publisher. The request may be sent directly to the publisher via, for example, an email message to the publisher, through a notification provided on a website for publishers, or other.

The method 900 may also involve sending 914 a notification to a remote computing device, such as a server, indicating that the relevant publisher data has been displayed. The notification may also include information such as whether the customer interacted with, selected, or otherwise obtained additional information about the relevant publisher data set. The notification may be used to compile statistical information providing data regarding the exposure of the relevant publisher data set through the data set index.

Figure 10:
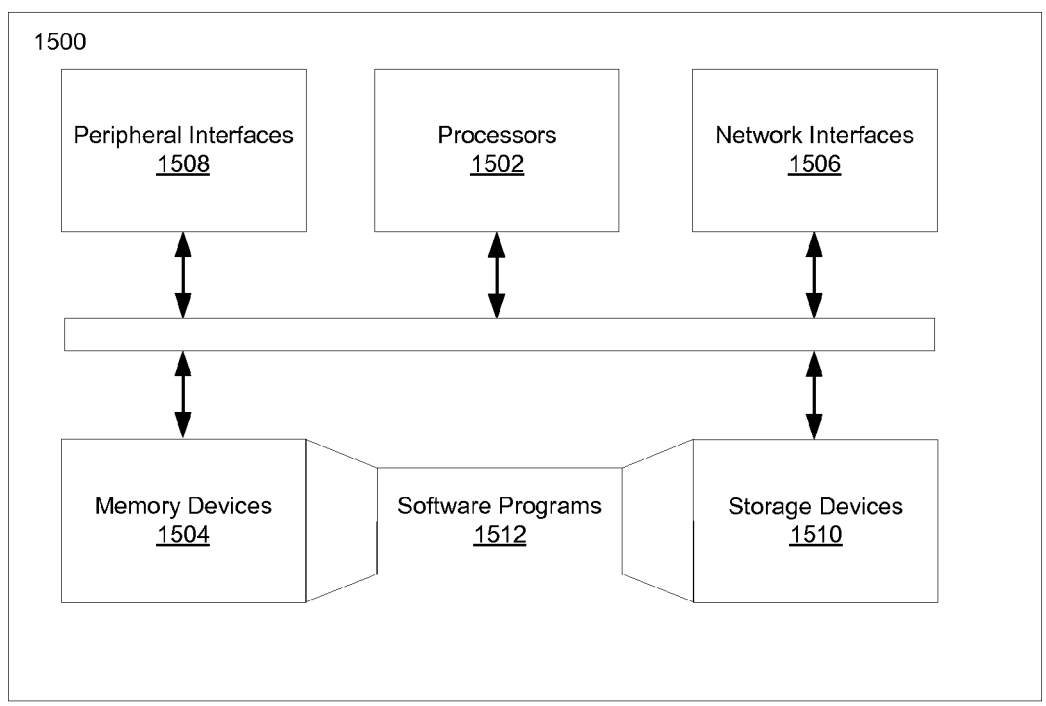
FIG. 10 illustrates a schematic view of a processor system.

Embodiments of the disclosure may also include one or more systems for implementing one or more embodiments of the method for exposing publisher data sets. FIG. 10 illustrates a schematic view of such a computing device or processor system 1500, according to an embodiment. The processor system 1500 may include one or more processors 1502 of varying core configurations (including multiple cores) and clock frequencies. The one or more processors 1502 may be operable to execute instructions, apply logic, etc. It will be appreciated that these functions may be provided by multiple processors or multiple cores on a single chip operating in parallel and/or communicably linked together. In at least one embodiment, the one or more processors 1502 may be or include one or more GPUs.

The processor system 1500 may also include a memory system, which may be or include one or more memory devices and/or computer-readable media 1504 of varying physical dimensions, accessibility, storage capacities, etc. such as flash drives, hard drives, disks, random access memory, etc., for storing data, such as images, files, and program instructions for execution by the processor 1502. In an embodiment, the computer-readable media 1504 may store instructions that, when executed by the processor 1502, are configured to cause the processor system 1500 to perform operations. For example, execution of such instructions may cause the processor system 1500 to implement one or more portions and/or embodiments of the method(s) described above.

The processor system 1500 may also include one or more network interfaces 1506. The network interfaces 1506 may include any hardware, applications, and/or other software. Accordingly, the network interfaces 1506 may include Ethernet adapters, wireless transceivers, PCI interfaces, and/or serial network components, for communicating over wired or wireless media using protocols, such as Ethernet, wireless Ethernet, etc.

As an example, the processor system 1500 may be a mobile device that includes one or more network interfaces for communication of information. For example, a mobile device may include a wireless network interface (e.g., operable via one or more IEEE 802.11 protocols, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

The processor system 1500 may further include one or more peripheral interfaces 1508, for communication with a display, projector, keyboards, mice, touchpads, sensors, other types of input and/or output peripherals, and/or the like. In some implementations, the components of processor system 1500 are not enclosed within a single enclosure or even located in close proximity to one another, but in other implementations, the components and/or others may be provided in a single enclosure. As an example, a system may be a distributed environment, for example, a so-called "cloud" environment where various devices, components, etc. interact for purposes of data storage, communications, computing, etc. As an example, a method may be implemented in a distributed environment (e.g., wholly or in part as a cloud-based service).

As an example, information may be input from a display (e.g., a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

The memory device 1504 may be physically or logically arranged or configured to store data on one or more storage devices 1510. The storage device 1510 may include one or more file systems or databases in any suitable format. The storage device 1510 may also include one or more software programs 1512, which may contain interpretable or executable instructions for performing one or more of the disclosed processes. When requested by the processor 1502, one or more of the software programs 1512, or a portion thereof, may be loaded from the storage devices 1510 to the memory devices 1504 for execution by the processor 1502.

Those skilled in the art will appreciate that the above-described componentry is merely one example of a hardware configuration, as the processor system 1500 may include any type of hardware components, including any accompanying firmware or software, for performing the disclosed implementations. The processor system 1500 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 1500 may be used to execute programs according to instructions received from another program or from another processor system altogether. Similarly, commands may be received, executed, and their output returned entirely within the processing and/or memory of the processor system 1500. Accordingly, neither a visual interface command terminal nor any terminal may be provided for performing the described embodiments.

Likewise, the methods described, in some embodiments, may not be performed in the same sequence discussed or with the same degree of separation. Various aspects may be omitted, repeated, combined, or divided, as appropriate to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques. In the claims that follow, section 112 paragraph sixth is not invoked unless the phrase "means for" is used.

What is claimed is:

1. A system for displaying publisher data sets, the system comprising:
    a computer server containing an index of publisher data sets, the computer server configured to:
        receive a plurality of index entries from a plurality of publishers of a plurality of publisher data sets, wherein the plurality of index entries each comprise metadata associated with a publisher data set of the plurality of publisher data sets, the publisher data set corresponding to the index entry, wherein the plurality of publisher data sets is collections of data that the plurality of publishers makes available to third parties corresponding to the index entries;
        generate the index from the plurality of index entries; and
        make the index available to one or more computing devices;
    a computing device in communication with the computer server, which computing device is configured to:
        access the index from the computer server;
        determine one or more criteria for selecting customer data sets from a plurality of customer data sets based on an application executing on the computing device;
        identify one or more customer data sets associated with the context of the application;
        using the index, identify one or more publisher data sets by applying the one or more criteria to the plurality of customer data sets; and
        display information about the one or more customer data sets and information about the one or more publisher data sets, wherein the one or more customer data sets are visually differentiated from the information about one or more publisher data sets;
        receive a selection, from the one or more index entries, of an index entry that satisfies the criteria; and
        send a request for the publisher data set associated with the index entry to a publisher of the publisher data set, the publisher data set being in the plurality of publisher data sets and the publisher being in the plurality of publishers.

2. The system of claim 1, the computer server further configured to insert the plurality of index entries from one or more publishers into the index.

3. The system of claim 1, wherein the computing device stores a local copy of the index.

4. The system of claim 1, wherein: identifying one or more customer data sets associated with the context of the application comprises identifying one or more customer data sets satisfying the one or more criteria.

5. The system of claim 1, further comprising an indexing tool for creating the plurality of index entries.

6. The system of claim 1, further comprising a publisher data set module for identifying the one or more publisher data sets, the publisher data set module executing on the computing device.

7. A non-transitory computer-readable medium with instructions stored thereon, that when executed by a processor of a computing device, perform the steps comprising:
    determining one or more criteria for selecting one or more customer data sets for an application;
    selecting the one or more customer data sets that satisfy the one or more criteria;

searching an index of a plurality of publisher data sets for one or more index entries that satisfy the one or more criteria, wherein the plurality of publisher data sets is collections of data that a plurality of publishers makes available to third parties, wherein the index is received from a remote computing device, and wherein the plurality of index entries are created by the plurality of publishers having the plurality of publisher data sets corresponding to the plurality of index entries;

selecting the one or more index entries that satisfy the criteria;

displaying information about the selected customer data sets and the selected index entries:, receiving a selection, from the one or more index entries, of an index entry that satisfies the criteria; and sending, by the processor, a request for a publisher data set associated with the index entry to a publisher of the publisher data set, the publisher data set being in the plurality of publisher data sets and the publisher being in the plurality of publishers.

8. The non-transitory computer-readable medium of claim 7, wherein the index is stored locally on the non-transitory computer-readable medium.

9. The non-transitory computer-readable medium of claim 7, wherein the index is stored on a remote computing device.

10. The non-transitory computer-readable medium of claim 9, further comprising the step of updating the index from the remote computing device.

11. The non-transitory computer-readable medium of claim 7, wherein the one or more criteria comprises one or both of a data set type and a geographic location.

12. The non-transitory computer-readable medium of claim 7, further comprising the steps of:

receiving, from a user of the application, a selection of an index entry that satisfies the criteria; and sending a request for the publisher data set associated with the index entry to a publisher of the publisher data set.

13. The non-transitory computer-readable medium of claim 7, further comprising visually differentiating between the selected customer data sets and the selected index entries.

14. A computer-implemented method comprising:

accessing an index comprising a plurality of index entries, the index stored on a remote computing device, wherein the plurality of index entries represents a plurality of publisher data sets, wherein the plurality of publisher data sets is collections of data that the plurality of publishers makes available to third parties, and wherein the plurality of index entries comprises metadata describing the plurality of publisher data sets;

determining one or more criteria for selecting customer data sets from a plurality of customer data sets based on an application;

identifying one or more customer data sets by applying the one or more criteria to the plurality of customer data sets;

using the index, identifying one or more publisher data sets by applying the one or more criteria to the index, the one or more publisher data sets in the plurality of publisher data sets;

displaying information about the one or more customer data sets and the one or more publisher data sets, wherein the information about the one or more customer data sets are visually differentiated from the information about the one or more publisher data sets:, receiving a selection, from the information, of a publisher data set that satisfies the one or more criteria; and sending, by a processor, a request for the publisher data set to a publisher of the publisher data set, the publisher data set being in the one or more publisher data sets and the publisher being in the plurality of publishers.

15. The computer-implemented method of claim 14, wherein displaying the comprises displaying an icon representing the one or more customer data sets and the one or more publisher data sets.

16. The computer-implemented method of claim 14, wherein determining the context of the application comprises determining one or more rules for selecting customer data sets.

17. The computer-implemented method of claim 16, wherein identifying one or more customer data sets associated with the context of the application comprises applying the one or more rules to the customer data sets.

18. The computer-implemented method of claim 16, wherein identifying one or more publisher data sets associated with the context of the application comprises applying the one or more rules to the index.

19. The computer-implemented method of claim 14, further comprising tracking exposure information for the one or more publisher data sets.

* * * * *